(12) United States Patent
Zhang et al.

(10) Patent No.: US 11,959,238 B1
(45) Date of Patent: Apr. 16, 2024

(54) TREATMENT SYSTEM AND METHOD FOR SANDY SOIL LANDFILL SOLID WASTE POLLUTED RIVER CHANNEL

(71) Applicant: Nanjing Institute of Environmental Sciences, MEE, Nanjing (CN)

(72) Inventors: Houhu Zhang, Nanjing (CN); Xiaofei Yan, Nanjing (CN); Jinglong Liu, Nanjing (CN); Lichen Liang, Nanjing (CN); Congcong Sun, Nanjing (CN); Xiang Chen, Nanjing (CN); Cheng Zhang, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/518,915

(22) Filed: Nov. 24, 2023

(30) Foreign Application Priority Data

Jun. 5, 2023 (CN) .......................... 202310652189.1

(51) Int. Cl.
*E02B 3/14* (2006.01)
*E02D 17/20* (2006.01)

(52) U.S. Cl.
CPC ................ *E02B 3/14* (2013.01); *E02D 17/20* (2013.01)

(58) Field of Classification Search
CPC .................................. E02B 3/14; E02D 17/20
See application file for complete search history.

(56) References Cited

FOREIGN PATENT DOCUMENTS

| | | | |
|---|---|---|---|
| CN | 102021897 | A | 4/2011 |
| CN | 103523889 | A | 1/2014 |
| CN | 203603109 | U | 5/2014 |
| CN | 102966071 | B | 7/2014 |
| CN | 207238749 | U | 4/2018 |
| CN | 108975516 | A | 12/2018 |
| CN | 110980830 | A | 4/2020 |
| CN | 111423053 | A | 7/2020 |
| CN | 111439851 | A | 7/2020 |
| CN | 112573788 | A | 3/2021 |
| CN | 113235710 | A | 8/2021 |

(Continued)

OTHER PUBLICATIONS

Search Report, issued in CN202310652189.1 (priority application), by CNIPA, dated Jul. 13, 2023.

(Continued)

*Primary Examiner* — Kyle Armstrong
(74) *Attorney, Agent, or Firm* — Zhu Lehnhoff LLP

(57) ABSTRACT

A system for a sandy soil landfill solid waste polluted river channel, includes a ground water interception and diversion system and a river channel ecological remediation system. The ground water interception and diversion system includes a water intake well arranged upstream of ground water in a landfill area, a buffer pool communicated with the water intake well, and a wastewater treatment system communicated with the buffer pool. The water intake well, the buffer pool, and the wastewater treatment system are communicated through a wastewater pipe. An electric wastewater valve and a variable frequency water pump are arranged on the wastewater pipe in sequence. The river channel ecological remediation system includes an impermeable layer arranged at a bottom of a river channel and ecological bank protections arranged on both sides of a river channel slope.

6 Claims, 2 Drawing Sheets

(56) References Cited

FOREIGN PATENT DOCUMENTS

| | | | |
|---|---|---|---|
| CN | 113830936 | A | 12/2021 |
| CN | 215630178 | U | 1/2022 |
| CN | 115094820 | A | 9/2022 |
| JP | 2001271324 | A * | 10/2001 |
| JP | 2004049119 | A * | 2/2004 |
| JP | 3975426 | B2 * | 9/2007 |
| JP | 4031967 | B2 * | 1/2008 |
| KR | 101531799 | B1 * | 6/2015 |

OTHER PUBLICATIONS

Search Report, prepared by Beijing Zhanqiao Intellectual Property Agency, dated Oct. 16, 2023.
Notice of Grant of Invention Patent Rrights, issued in CN202310652189.1 (priority application), by CNIPA, dated Jul. 16, 2023.

* cited by examiner

TREATMENT SYSTEM AND METHOD FOR SANDY SOIL LANDFILL SOLID WASTE POLLUTED RIVER CHANNEL

REFERENCE TO RELATED APPLICATIONS

The present application claims the priority of Chinese patent application No. 202310652189.1, filed on 2023 Jun. 5, the entire disclose of which is incorporated herein by reference.

TECHNICAL FIELD

The present disclosure relates to the technical field of sewage treatment, and in particular, to a treatment system and method for a sandy soil landfill solid waste polluted river channel.

BACKGROUND

With the rapid development of industrialization and urbanization, the production of solid waste is increasing day by day. Environmental pollution events such as improper stockpiling and illegal dumping disposal of the solid waste occur frequently, including landfilling a lot of solid waste in areas along rivers and lakes. The solid waste, especially hazardous waste, contains a large amount of toxic and harmful components. After illegal landfill, the solid waste is in contact with ground water. Harmful substances will be released into the ground water and enter nearby river channels through the ground water, which results in the diffusion of the harmful substances, and will cause harm to both ecology and human health.

Under normal conditions, the harm of solid waste landfill is eliminated by carrying out soil and ground water remediation in a landfill area after dredging and disposing the solid waste in different locations. This method is costly and has difficulty in construction. The shallow ground water level in some areas along rivers and lakes and the encounter of sandy soil with high permeability not only increase the difficulty in solid waste removal and remediation of damaged environment, but also greatly increases related costs.

The present disclosure provides a treatment method for a sandy soil landfill solid waste polluted river channel. The difficult problem of further pollution of river channels after the contact of the ground water and the solid waste caused by sandy soil is solved by combining interception and diversion of the ground water in the landfill areas and river channel ecological remediation. Compared with carrying out ground water and soil remediation after dredging landfill solid waste, the cost is relatively low, and the construction difficulty is greatly reduced.

SUMMARY

In order to solve the above technical problem, the present disclosure provides a method and a treatment system for a sandy soil landfill solid waste polluted river channel.

The technical solution of the present disclosure is that: a treatment method for a sandy soil landfill solid waste polluted river channel uses a treatment system for a sandy soil landfill solid waste polluted river channel. The treatment system includes a ground water interception and diversion system and a river channel ecological remediation system.

The ground water interception and diversion system includes a water intake well arranged upstream of ground water in a landfill area, a buffer pool communicated with the water intake well, and a wastewater treatment system communicated with the buffer pool. The water intake well, the buffer pool, and the wastewater treatment system are communicated through a wastewater pipe. An electric wastewater valve and a variable frequency water pump are arranged on the wastewater pipe in sequence.

The river channel ecological remediation system includes an impermeable layer arranged at a bottom of a river channel and ecological bank protections arranged on both sides of a river channel slope. The impermeable layer includes a clay cover layer with a thickness of 50 to 55 cm, bentonite with a thickness of 30 to 35 cm, and a High-Density Polyethylene (HDPE) film with a thickness of 1.5 to 3 mm in sequence from top to bottom. The ecological bank protections include ecological slope protections arranged on both sides of the slope, ecological prefabricated bricks arranged on the ecological slope protections, and slope protection green plants planted between the ecological prefabricated bricks. The ecological prefabricated bricks are made of ecological concrete. Through holes are formed in the prefabricated bricks.

Treatment steps of the treatment method are as follows:

S1, construction of ground water interception and diversion system

S1-1, arranging the water intake well upstream of the ground water in the landfill area to ensure that the ground water does not flow through the solid waste landfill area;

S1-2, pumping the ground water by using the water intake well, enabling the ground water to enter the buffer pool through the wastewater pipe, the electric wastewater valve, and the variable frequency water pump in sequence, monitoring the water quality by using an online water quality detection instrument arranged in the buffer pool, discharging the water into the river channel in a case that the water quality is up to standards, enabling the wastewater to enter the wastewater treatment system in a case that the water quality is up to standards, and treating the wastewater and discharging the wastewater to the river channel after the wastewater is up to the standards;

S2, construction of river channel ecological remediation system laying the HDPE film with a thickness of 1 to 2 mm, the bentonite with a thickness of 25 to 35 cm, and the clay cover layer with a thickness of 45 to 55 cm at the bottom of the river channel in sequence from bottom to top;

S3, construction of bank protections splicing and fixing the ecological prefabricated bricks to the ecological slope protections to construct ecological bank protections, and planting the slope protection green plants between two adjacent ecological prefabricated bricks and on the surfaces of the ecological prefabricated bricks, where a preparation process for the ecological prefabricated brick includes the following steps:

1) uniformly mixing ecological concrete, an adhesive, an additive, humus, and water serving as raw materials in a mass ratio of 12 to 36:2:0.3 to 0.5:5:8 to 10, pouring a mixture into a rectangular mold, and vibrating the interior of the mold by using a vibrating spear with a vibration frequency of 100 to 125 Hz during pouring until the shape of the mixture is flush with each side of the rectangular mold to obtain a green brick;

2) naturally air-drying the green brick in a drying room for 30 to 40 min, taking out the green brick, arranging xxy snail shells with cut-through tails on one side surface of the green brick, where x is 5 to 7, y is 3 to 4, and the units of x and y are pieces; drilling once between every two snail shells by using a drill bit to form a through hole; after drilling, placing the green brick in the drying room again; adjusting the temperature to 25 to 40° C., and continuing to dry for 10 to 15 min; finally, taking out the green brick from the drying room and placing the green brick in a firing kiln, preserving heat at 1400 to 1500° C. for 1.5 to 3 h, firing and molding, taking out the green brick, and demolding to obtain a molded brick; and 3) respectively filling the through holes and cavities of the snail shells with herb seed-containing silt; continuing to place the green brick in the drying room; adjusting the temperature to 20 to 30° C., drying for 20 to 40 min, and taking out the green brick to obtain the ecological prefabricated brick, where the silt contains the herb seeds, the seeding density reaches 10 to 25 kg/mu, and the herb seeds are any species of *Festuca arundinacea*, *bermuda* grass, or tifway.

The ecological concrete is a mixture obtained by mixing sandy soil in the river channel, fly ash, and cement in a weight ratio of 10 to 15:5 to 7:1 to 3; the adhesive is a mixture of one or more of gelatinized raw starch, borax, bentonite, and water-based epoxy resin adhesive; the additive is lime and/or barium carbonate; and the humus is a fermented and decomposed product of sawdust, fruit peels, and straw.

Note: The ground water interception and diversion system effectively prevents the ground water from flowing through the solid waste landfill area and then flowing to the river channel to pollute the river channel without dredging and treating the solid waste in the landfill area, which omits a process of performing remediation on the ecological environment in the landfill area after solid waste dredging, and greatly improves the pollution of the solid waste in the landfill area on the river channel. The manner of the HDPE film+the bentonite+the clay cover layer effectively ensures that sediment of the river channel is not affected by the pollution. Bank protections are constructed on the slope by using active ecological prefabricated bricks containing plant seeds, which achieves double effects of aesthetics and pollution interception. The treatment efficiency of the river channel is further improved. Meanwhile, the addition of the additive and the humus can effectively improve the stability and the strength of raw materials of the green brick. The humus has a certain calorific value and plasticity, which can achieve an improvement effect on the adhesion of the ecological concrete and can effectively reduce holes generated in the surface of the green brick in a process of making the green brick, thereby reducing the influence of inorganic impurities mixed in the ecological concrete on the strength of the brick. Barium carbonate is used for improving the chemical resistance of the brick. The through holes and the snail shells respectively arranged in a staggered manner can effectively increase the contact area between the herb seed-containing silt and a water flow of the river channel, so as to achieve a better pollution interception purpose. Treating the sandy soil landfill solid waste polluted river channel by the above method can effectively avoid a solid waste landfill area on the basis of effectively ensuring that the sediment of the river channel is not affected by the pollution, and realize better ecological environment remediation.

Further, the slope protection green plants include *Festuca arundinacea*, manila hemp, bluegrass, and reed.

Note: the above slope protection green plants can effectively intercept and adsorb particles and impurities in the water in the river channel, and improve the water quality of the river channel. Meanwhile, the above slope protection green plants do not have strict requirements on soil, have well-developed root systems, have degradation and differentiation effects on toxic components and heavy metals in the water, and can also effectively increase the efficiency of roots penetrating into an inner layer of soil, thereby achieving a better slope protection effect.

Further, curing treatment is performed on the ecological concrete, and a method for the curing treatment includes the following steps:

storing the ecological concrete prepared according to the above ratio inside a closed curing cover, uniformly covering the surface of the ecological concrete with a straw curtain, curing for 2 to 5 h at a temperature of 10 to 15° C., adjusting the temperature in the curing cover at a speed of 5 to 7° C./h, injecting wet oxygen with the purity of 99 to 99.99% at a speed of 5 to 10 mL/h in the curing cover until the temperature difference between the temperature in the curing cover and the outdoor temperature is 3 to 5° C., stopping heating, reducing the injection amount of the wet oxygen at a frequency of 0.5 to 1 mL/h, stopping injecting the wet oxygen and withdrawing the concrete out of the curing cover after the humidity of the ecological concrete in the curing cover reaches 70 to 80%, and standing and cooling for later use, where the water content of the wet oxygen is 20 to 30%.

Note: By using the above curing method, the overall density of the ecological concrete can be effectively improved, micro-cracking of the concrete is effectively controlled, and the anti-penetrability performance and the durability of the concrete are further improved. In a gradient heating manner, the ecological concrete can be cured more fully, which avoids a large-area crack caused by sudden heating. The wet oxygen in the above injection injection amount can effectively maintain the water content in the environment during heating in early curing, so as to prevent seasoning cracks and cracks in the surface of the concrete, thereby further improving the strength and the durability of the concrete. Continuing to inject the wet oxygen after stopping heating in a later stage can effectively cool the surface of the concrete, which further avoids surface cracks generated under an uneven heat condition, thereby reducing the possibility of cracking.

Further, in step 2), firing and molding include the following stages:

preliminary sintering: heating to adjust the temperature in the firing kiln at a speed of 25 to 50° C./h, injecting liquid oxygen with a mass concentration of 3 to 5% in the firing kiln at a speed of 30 to 50 mL/h until the firing kiln is preheated to 100 to 150° C., and stopping injecting the liquid oxygen to obtain a preliminarily sintered brick;

mixed sintering: continuing to inject natural gas on the basis of the original liquid oxygen, and adjusting the temperature in the firing kiln to 700 to 800° C. at a heating speed of 50 to 100° C./h to complete the mixed sintering; and full sintering: continuing to heat the firing kiln to 1400 to 1500° C. at a heating speed of ⅓ to ⅕ $(T_2-T_1)$/h, continuing to inject liquid nitrogen accounting for 5 to 10% of the total injection amount of the natural gas during this period, and continuing to sinter for 1.5 to 3 h.

Note: Three steps of preliminary sintering, mixed sintering, and full sintering are performed in sequence; the liquid oxygen, a mixture of the liquid oxygen and the natural gas in the above ratio, and the liquid nitrogen are injected in sequence, which can fully sinter the green brick; meanwhile, the injection amount and the number of injections of the natural gas can be efficiently adjusted according to the above calculation formula based on the injection condition of the liquid oxygen, so that the effectiveness of each combustion-supporting gas is higher. Therefore, the performance of the prepared molded brick is higher.

Further, a demolding method includes the following steps: transferring the mold into a cooling room, preliminarily cooling to 50 to 60° C. in the air at 25 to 35° C. first, then immersing the mold in a chamber filled with a cooling liquid and continuing to cool for 20 to 30 min, and finally, taking out the green brick from the mold to obtain the ecological prefabricated brick.

Note: Performing air cooling first and then liquid cooling on the green brick can effectively realize uniform temperature, the temperature reduction efficiency is high, and cracking of the brick is effectively avoided.

Furthermore, the cooling liquid includes the following components in percentage by mass: 20 to 30% of ethylene glycol, 15 to 20% of calcium chloride, 0.5 to 1.5% of sorbic acid, and the balance of distilled water.

Note: The above cooling liquid can achieve the purposes of anti-freezing and anti-corrosion on the basis of efficient cooling of the green brick, improve the quality of the green brick, and further promote the preparation of the ecological prefabricated brick.

Further, a permeability coefficient of the clay cover layer is less than $10^{-5}$ cm/s.

Note: The above permeability coefficient can effectively ensure the permeation of a pollutant to the sediment of the river channel, so as to prevent the sediment of the river channel from being affected by pollution.

Further, a method for planting the slope protection green plants includes: reserving a gap of 3 to 5 cm between two adjacent ecological prefabricated bricks, loosening slope soil in the gap at a depth of 5 to 7 mm, adding clay accounting for 10 to 15% of the mass of the slope soil and mancozeb accounting for 3 to 5% of the mass of the slope soil to the gap, stirring uniformly, and spraying urea into the gap according to 15 to 20 mL/time; spraying for 3 to 5 times; and finally, planting the slope protection green plants in the gap.

Note: A mixture formed by mixing the clay and the mancozeb in the above mass ratio is added to the slope soil, which can provide an excellent soil environment for the planting of the slope protection green plants. The addition of the mancozeb can activate the activity of urease in the soil in a short term, and meanwhile, the sprayed urea can be decomposed into substances that can be used by plants under the action of the urease, thereby improving the fertility of the soil and further promoting the growth of the slope protection green plants.

The present disclosure has the following beneficial effects:

(1) For a sandy soil area with high water permeability, the ground water interception and diversion system effectively prevents the ground water from flowing through the solid waste landfill area and then flowing to the river channel to pollute the river channel without dredging and treating the solid waste in the landfill area, which omits a process of performing remediation on the ecological environment in the landfill area after solid waste dredging, greatly improves the pollution of the solid waste in the landfill area on the river channel, and effectively solves the problems of high cost and difficult construction of solid waste dredging and ecological remediation after dredging.

(2) The manner of laying the HDPE film+the bentonite+the clay cover layer at the bottom of a river effectively prevents the sediment of the river channel from being affected by the pollution. Bank protections are constructed on the slopes by using active ecological prefabricated bricks containing plant seeds, which achieves double effects of aesthetics and pollution interception. The treatment efficiency of the river channel is further improved, and the pollution of the landfill solid waste to the river channel environment is eliminated.

(3) Note: The addition of the additive and the humus to preparation raw materials for the ecological prefabricated brick, which effectively improves the stability and the strength of the raw materials. Meanwhile, the humus has a certain calorific value and plasticity, so an improvement effect can be achieved on the adhesion of the ecological concrete and holes generated in the surface of the green brick can be effectively reduced in a process of making the green brick, thereby reducing the influence of inorganic impurities mixed in the ecological concrete on the strength of the brick. Barium carbonate is used for improving the chemical resistance of the brick. Through holes and snail shells respectively arranged in a staggered manner can effectively increase the contact area between the herb seed-containing silt and a water flow of the river channel, so as to achieve a better pollution interception purpose.

Figure 1:
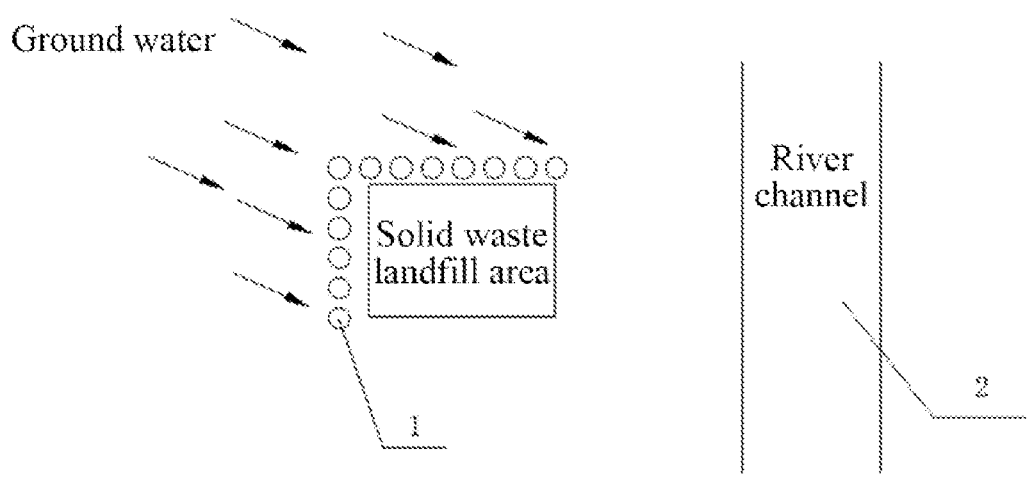
FIG. 1 is a schematic diagram of arrangement of a water intake well of the present disclosure.

In the drawings: 1—ground water interception and diversion system, 1-1—water intake well, 1-2—wastewater pipe, 1-3—electric wastewater valve, 1-4—variable frequency water pump, 1-5—buffer pool, 1-6—wastewater treatment system, 2—river channel ecological remediation system, 2-1—clay cover layer, 2-2—bentonite, 2-3—HDPE film, 2-4—ecological slope protection, 2-5—ecological prefabricated brick, and 2-6—slope protection green plants.

DETAILED DESCRIPTION OF THE EMBODIMENTS

The present disclosure will be further described in detail below with reference to specific implementations to better reflect the advantages of the present disclosure.

Figure 2:
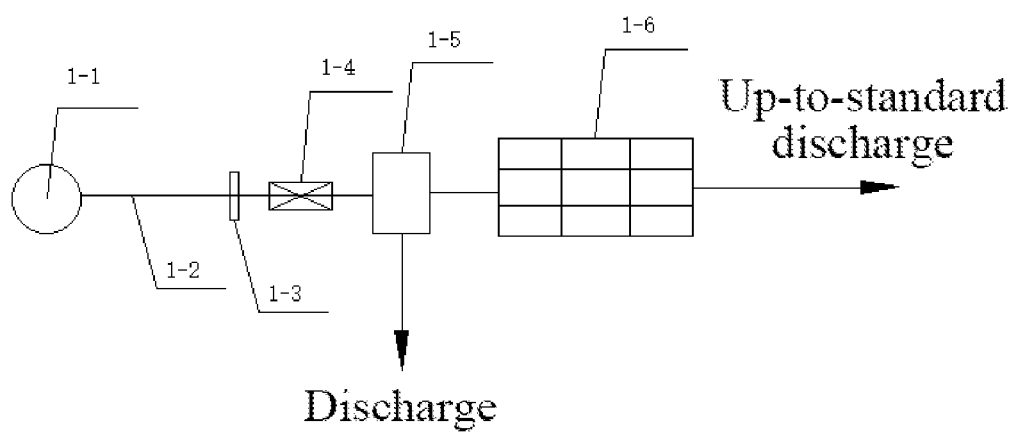
FIG. 2 is a schematic diagram of treatment of pumped ground water of the present disclosure.
Figure 3:
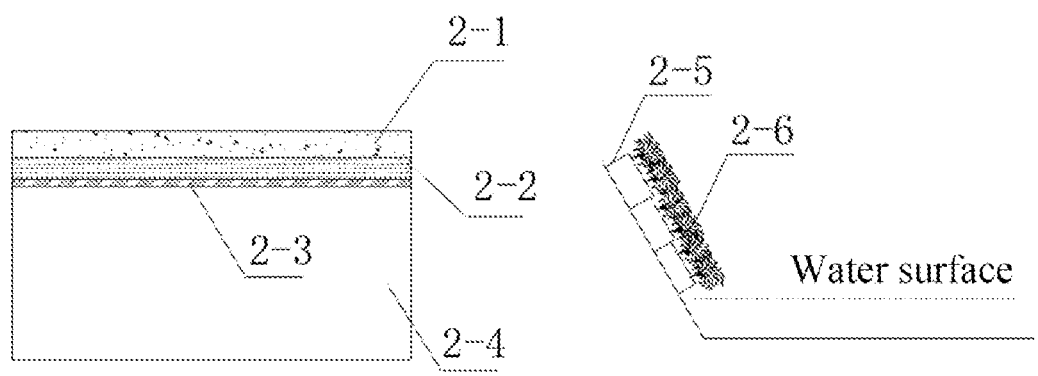
FIG. 3 is a schematic diagram of a river channel ecological remediation method of the present disclosure.

Embodiment 1: As shown in FIG. 1 to FIG. 3, a treatment system for a sandy soil landfill solid waste polluted river channel includes a ground water interception and diversion system 1 and a river channel ecological remediation system 2.

The ground water interception and diversion system 1 includes a water intake well 1-1 arranged upstream of ground water in a landfill area, a buffer pool 1-5 communicated with the water intake well 1-1, and a wastewater treatment system 1-6 communicated with the buffer pool 1-5. The water intake well 1-1, the buffer pool 1-5, and the wastewater treatment system 1-6 are communicated through a wastewater pipe 1-2. An electric wastewater valve 1-3 and a variable frequency water pump 1-4 are arranged on the wastewater pipe 1-2 in sequence.

The river channel ecological remediation system 2 includes an impermeable layer arranged at a bottom of a river channel and ecological bank protections arranged on both sides of a river channel slope; the impermeable layer includes a clay cover layer 2-1 with a thickness of 52 cm, bentonite 2-2 with a thickness of 33 cm, and an HDPE film 2-3 with a thickness of 2 mm in sequence from top to bottom; the ecological bank protections include ecological slope protections 2-4 arranged on both sides of the slope, ecological prefabricated bricks 2-5 arranged on both sides of the ecological slope protection 2-4, and slope protection green plants 2-6 planted between two adjacent ecological prefabricated bricks 2-5 and on the surfaces of the ecological prefabricated bricks 2-5; the ecological prefabricated bricks 2-5 are made of ecological concrete; and through holes are formed in the prefabricated bricks.

Slope protection green plants 2-6 include *Festuca arundinacea*, manila hemp, bluegrass, and reed.

A preparation process for the ecological prefabricated brick 2-5 includes the following steps:
1) uniformly mixing ecological concrete, an adhesive, an additive, humus, and water in a mass ratio of 24:2:0.4:5:9, pouring a mixture into a rectangular mold, and vibrating the interior of the mold by using a vibrating spear with a vibration frequency of 112 Hz during pouring until the shape of the mixture is flush with each side of the rectangular mold to obtain a green brick;
2) naturally air-drying the green brick in a drying room for 35 min, taking out the green brick, arranging x×y snail shells with cut-through tails on one side surface of the green brick, where x is 6, and y is 3; drilling once between every two snail shells by using a drill bit to form a through hole; after drilling, placing the green brick in the drying room again; adjusting the temperature to 32° C., and continuing to dry for 13 min; finally, taking out the green brick and placing the green brick in a firing kiln, preserving heat at 1450° C. for 2 h, firing and molding, taking out the green brick, and demolding to obtain a molded brick;
3) respectively filling the through holes and cavities of the snail shells with herb seed-containing silt; continuing to place the green brick in the drying room; adjusting the temperature to 25° C., drying for 30 min, and taking out the green brick to obtain the ecological prefabricated brick 2-5, where the silt contains herb seeds, the seeding density reaches 20 kg/mu, and the herb seeds are *bermuda* grass.

The ecological concrete is a mixture obtained by mixing sandy soil in the river channel, fly ash, and cement in a weight ratio of 6:3:1; the adhesive is gelatinized raw starch; the additive is barium carbonate; and the humus is a fermented and decomposed product of sawdust.

Curing treatment is performed on the ecological concrete, and a method for the curing treatment includes the following steps:
storing the obtained ecological concrete inside a closed curing cover, uniformly covering the surface of the ecological concrete with a straw curtain, curing for 3.5 h at a temperature of 12° C., adjusting the temperature in the curing cover at a speed of 6° C./h, injecting wet oxygen with the purity of 99.9% at a speed of 8 mL/h in the curing cover until the temperature difference between the temperature in the curing cover and the outdoor temperature is 4° C., stopping heating, reducing the injection amount of the wet oxygen at a frequency of 0.8 mL/h, stopping injecting the wet oxygen and withdrawing the ecological concrete out of the curing cover after the humidity of the ecological concrete in the curing cover reaches 75%, and standing and cooling for later use, where the water content of the wet oxygen is 25%.

In step 2), firing and molding include the following stages:
preliminary sintering: heating to adjust the temperature in the firing kiln at a speed of 35° C./h, injecting liquid oxygen with a mass concentration of 4% in the firing kiln at a speed of 40 mL/h until the firing kiln is preheated to 125° C., and stopping injecting the liquid oxygen to obtain a preliminarily sintered brick;
mixed sintering: continuing to inject natural gas on the basis of the original liquid oxygen, and adjusting the temperature in the firing kiln to 750° C. at a heating speed of 70° C./h to complete the mixed sintering; and
full sintering: continuing to heat the firing kiln to 1450° C. at a heating speed of 156° C./h, continuing to inject liquid nitrogen accounting for 7% of the total injection amount of the natural gas during this period, and continuing to sinter for 2 h.

A demolding method includes: transferring the mold into a cooling room, preliminarily cooling to 55° C. in the air at 30° C. first, then immersing the mold in a chamber filled with a cooling liquid and continuing to cool for 25 min, and finally, taking out the green brick from the mold to obtain the ecological prefabricated brick 2-5.

The cooling liquid includes the following components in percentage by mass: 25% of ethylene glycol, 18% of calcium chloride, 1% of sorbic acid, and the balance of distilled water.

The present embodiment also records a treatment method for a sandy soil landfill solid waste polluted river channel. Based on the above treatment system for a sandy soil landfill solid waste polluted river channel, the treatment method includes the following steps:
S1, construction of ground water interception and diversion system 1
S1-1, arranging the water intake well 1-1 upstream of the ground water in the landfill area to ensure that the ground water does not flow through the solid waste landfill area;
S1-2, pumping the ground water by using the water intake well 1-1, enabling the ground water to enter the buffer pool 1-5 through the wastewater pipe 1-2, the electric wastewater valve 1-3, and the variable frequency water pump 1-4 in sequence, monitoring the water quality by using an online water quality detection instrument arranged in the buffer pool 1-5, discharging the water into the river channel in a case that the water quality is up to standards, enabling the wastewater to enter the wastewater treatment system 1-6 in a case that the water quality is up to standards, and treating the wastewater and discharging the wastewater to the river channel after the wastewater is up to the standards;
S2, construction of river channel ecological remediation system 2
laying the HDPE film 2-3 with a thickness of 1.5 mm, the bentonite 2-2 with a thickness of 30 cm, and the clay cover layer 2-1 with a thickness of 50 cm at the bottom of the river channel in sequence from bottom to top;
S3, construction of bank protections
splicing and fixing the ecological prefabricated bricks 2-5 to the ecological slope protections 2-4 to construct ecological bank protections, and planting the slope protection green plants 2-6 between two adjacent ecological prefabricated bricks 2-5 and on the surfaces of the ecological prefabricated bricks 2-5.

A permeability coefficient of the clay cover layer 2-1 is less than $10^{-5}$ cm/s.

A method for planting the slope protection green plants 2-6 at a joint of the two adjacent ecological prefabricated bricks 2-5 includes: reserving a gap of 4 cm between the two adjacent ecological prefabricated bricks 2-5, loosening slope soil in the gap at a depth of 6 mm, adding clay accounting for 12% of the mass of the slope soil and mancozeb accounting for 4% of the mass of the slope soil to the gap, stirring uniformly, and spraying urea into the gap according to 18 mL/time; spraying for 4 times; and finally, planting the slope protection green plants 2-6 in the gap.

Embodiment 2: Different from Embodiment 1, the preparation process for the ecological prefabricated brick 2-5 includes the following steps:

1) uniformly mixing ecological concrete, an adhesive, an additive, humus, and water serving as raw materials in a mass ratio of 12:2:0.3:5:8, pouring a mixture into a rectangular mold, and vibrating the interior of the mold by using a vibrating spear with a vibration frequency of 100 Hz during pouring until the shape of the mixture is flush with each side of the rectangular mold to obtain a green brick;
2) naturally air-drying the green brick in a drying room for 30 min, taking out the green brick, arranging x×y snail shells with cut-through tails on one side surface of the green brick, where x is 5, and y is 3; drilling once between every two snail shells by using a drill bit to form a through hole; after drilling, placing the green brick in the drying room again; adjusting the temperature to 25° C., and continuing to dry for 15 min; finally, taking out the green brick and placing the green brick in a firing kiln, preserving heat at 1400° C. for 3 h, firing and molding, taking out the green brick, and demolding to obtain a molded brick; and
3) respectively filling the through holes and cavities of the snail shells with herb seed-containing silt; continuing to place the green brick in the drying room; adjusting the temperature to 20° C., drying for 40 min, and taking out the green brick to obtain the ecological prefabricated brick 2-5, where the silt contains herb seeds, the seeding density reaches 10 kg/mu, and the herb seeds are *Festuca arundinacea*.

The ecological concrete is a mixture obtained by mixing sandy soil in the river channel, fly ash, and cement in a weight ratio 10:5:1; the adhesive is borax; the additive is lime; and the humus is a fermented and decomposed product of fruit peels.

Embodiment 3: Different from Embodiment 1, the preparation process for the ecological prefabricated brick 2-5 includes the following steps:

1) uniformly mixing ecological concrete, an adhesive, an additive, humus, and water in a mass ratio of 36:2:0.5:5:10, pouring a mixture into a rectangular mold, and vibrating the interior of the mold by using a vibrating spear with a vibration frequency of 125 Hz during pouring until the shape of the mixture is flush with each side of the rectangular mold to obtain a green brick;
2) naturally air-drying the green brick in a drying room for 40 min, taking out the green brick, arranging x×y snail shells with cut-through tails on one side surface of the green brick, where x is 7, and y is 4; drilling once between every two snail shells by using a drill bit to form a through hole; after drilling, placing the green brick in the drying room again; adjusting the temperature to 40° C., and continuing to dry for 10 min; finally, taking out the green brick and placing the green brick in a firing kiln, preserving heat at 1500° C. for 1.5 h, firing and molding, taking out the green brick, and demolding to obtain a molded brick; and
3) respectively filling the through holes and cavities of the snail shells with herb seed-containing silt; continuing to place the green brick in the drying room; adjusting the temperature to 30° C., drying for 20 min, and taking out the green brick to obtain the ecological prefabricated brick 2-5, where the silt contains herb seeds, the seeding density reaches 25 kg/mu, and the herb seeds are tifway.

The ecological concrete is a mixture obtained by mixing sandy soil in the river channel, fly ash, and cement in a weight ratio of 15:7:3; the adhesive is bentonite; the additive is barium carbonate; and the humus is a fermented and decomposed product of straw.

Embodiment 4: Different from Embodiment 1, curing treatment is performed on the ecological concrete, and a method for the curing method includes:

storing the prepared ecological concrete inside a closed curing cover, uniformly covering the surface of the ecological concrete with a straw curtain, curing for 5 h at a temperature of 10° C., adjusting the temperature in the curing cover at a speed of 5° C./h, injecting wet oxygen with the purity of 99% at a speed of 5 mL/h in the curing cover until the temperature difference between the temperature in the curing cover and the outdoor temperature is 3° C., stopping heating, reducing the injection amount of the wet oxygen at a frequency of 0.5 mL/h, stopping injecting the wet oxygen and withdrawing the concrete out of the curing cover after the humidity of the ecological concrete in the curing cover reaches 70%, and standing and cooling for later use, where the water content of the wet oxygen is 20%.

Embodiment 5: Different from Embodiment 1, curing treatment is performed on the ecological concrete, and a method for the curing method includes:

storing the prepared ecological concrete inside a closed curing cover, uniformly covering the surface of the ecological concrete with a straw curtain, curing for 5 h at a temperature of 15° C., adjusting the temperature in the curing cover at a speed of 7° C./h, injecting wet oxygen with the purity of 99.99% at a speed of 10 mL/h in the curing cover until the temperature difference between the temperature in the curing cover and the outdoor temperature is 5° C., stopping heating, reducing the injection amount of the wet oxygen at a frequency of 1 mL/h, stopping injecting the wet oxygen and withdrawing the concrete out of the curing cover after the humidity of the ecological concrete in the curing cover reaches 80%, and standing and cooling for later use, where the water content of the wet oxygen is 30%.

Embodiment 6: Different from Embodiment 1, in step 2), firing and molding include the following stages:

preliminary sintering: heating to adjust the temperature in the firing kiln at a speed of 25° C./h, injecting liquid oxygen with a mass concentration of 3% in the firing kiln at a speed of 30 mL/h until the firing kiln is preheated to 100° C., and stopping injecting the liquid oxygen to obtain a preliminarily sintered brick;

mixed sintering: continuing to inject natural gas on the basis of the original liquid oxygen, and adjusting the temperature in the firing kiln to 700° C. at a heating speed of 50° C./h to complete the mixed sintering; and full sintering: continuing to heat the firing kiln to 1400° C. at a heating speed of 200° C./h, continuing to inject liquid nitrogen accounting for 5% of the total injection amount of the natural gas during this period, and continuing to sinter for 1.5 h.

Embodiment 7: Different from Embodiment 1, in step 2), firing and molding include the following stages:

preliminary sintering: heating to adjust the temperature in the firing kiln at a speed of 50° C./h, injecting liquid oxygen with a mass concentration of 5% in the firing kiln at a speed of 50 mL/h until the firing kiln is preheated to 150° C., and stopping injecting the liquid oxygen to obtain a preliminarily sintered brick;

mixed sintering: continuing to inject natural gas on the basis of the original liquid oxygen, and adjusting the temperature in the firing kiln to 800° C. at a heating speed of 100° C./h to complete the mixed sintering; and full sintering: continuing to heat the firing kiln to 1500° C. at a heating speed of 130° C./h, continuing to inject liquid nitrogen accounting for 10% of the total injection of the natural gas during this period, and continuing to sinter for 3 h.

Embodiment 8: Different from Embodiment 1, a demolding method includes: transferring the mold into a cooling room, preliminarily cooling to 60° C. in the air at 25° C. first, then immersing the mold in a chamber filled with a cooling liquid and continuing to cool for 30 min, and finally, taking out the green brick from the mold to obtain the ecological prefabricated brick 2-5.

Embodiment 9: Different from Embodiment 1, a demolding method includes: transferring the mold into a cooling room, preliminarily cooling to 50° C. in the air at 35° C. first, then immersing the mold in a chamber filled with a cooling liquid and continuing to cool for 20 min, and finally, taking out the green brick from the mold to obtain the ecological prefabricated brick 2-5.

Embodiment 10: Different from Embodiment 1, the cooling liquid includes the following components in percentage by mass: 20% of ethylene glycol, 15% of calcium chloride, 0.5% of sorbic acid, and the balance of distilled water.

Embodiment 11: Different from Embodiment 1, the cooling liquid includes the following components in percentage by mass: 30% of ethylene glycol, 20% of calcium chloride, 1.5% of sorbic acid, and the balance of distilled water.

Embodiments 12: Different from embodiment 1, S2, construction of the river channel ecological remediation system 2 includes:

laying an HDPE film 2-3 with a thickness of 1.5 mm, bentonite 2-2 with a thickness of 30 cm, and a clay cover layer 2-1 with a thickness of 50 cm at the bottom of the river channel in sequence from bottom to top.

Embodiments 13: Different from Embodiment 1, S2, construction of the river channel ecological remediation system 2 includes:

laying an HDPE film 2-3 with a thickness of 3 mm, bentonite 2-2 with a thickness of 35 cm, and a clay cover layer 2-1 with a thickness of 55 cm at the bottom of the river channel in sequence from bottom to top.

Embodiments 14: Different from Embodiment 1, a method for planting the slope protection green plants 2-6 at a joint of the two adjacent ecological prefabricated bricks 2-5 includes: reserving a gap of 3 cm between the two adjacent ecological prefabricated bricks 2-5, loosening slope soil in the gap at a depth of 5 mm, adding clay accounting for 10% of the mass of the slope soil and mancozeb accounting for 3% of the mass of the slope soil to the interior of the gap, stirring uniformly, and spraying urea into the gap according to 15 mL/time; spraying for 3 times; and finally, planting the slope protection green plants 2-6 in the gap.

Embodiments 15: Different from Embodiment 1, the method for planting the slope protection green plants 2-6 at the joint of the two adjacent ecological prefabricated bricks 2-5 includes: reserving a gap of 5 cm between the two adjacent ecological prefabricated bricks 2-5, loosening slope soil in the gap at a depth of 7 mm, adding clay accounting for 15% of the mass of the slope soil and mancozeb accounting for 5% of the mass of the slope soil to the gap, stirring uniformly, and spraying urea into the gap according to 20 mL/time; spraying for 5 times; and finally, planting the slope protection green plants 2-6 in the gap.

Experimental examples: Treatment effects of various embodiments are respectively tested for the treatment systems formed in various embodiments. An average value of test results of 5 treatment effects of each embodiment is taken as a performance measurement result of the embodiment. Specific exploration is as follows:

1. The influence of various parameters of the treatment system and parameters of various components on the removal rate of solid waste pollution at river channels is explored.

Experimental comparison is made between Embodiments 1 to 15 and Comparative examples 1 to 5, and results are as shown in Table 1:

TABLE 1

Influence on removal rate (%) of solid waste pollution at river channels in embodiments and comparative examples

| | Group | | | | | | |
|---|---|---|---|---|---|---|---|
| | Embodiment 1 | Embodiment 2 | Embodiment 3 | Embodiment 4 | Embodiment 5 | Embodiment 6 | Embodiment 7 |
| Removal rate of solid waste pollution | 90.1 | 88.5 | 88.0 | 88.3 | 88.8 | 89.2 | 89.1 |

TABLE 1-continued

Influence on removal rate (%) of solid waste pollution at river channels in embodiments and comparative examples

| | Group | | | | | | |
|---|---|---|---|---|---|---|---|
| | Embodiment 8 | Embodiment 9 | Embodiment 10 | Embodiment 11 | Embodiment 12 | Embodiment 13 | Embodiment 14 |
| Removal rate of solid waste pollution | 88.5 | 88.3 | 89.1 | 88.7 | 89.4 | 88.4 | 89.7 |

| | Group | | | | | |
|---|---|---|---|---|---|---|
| | Embodiment 15 | Comparative example 1 | Comparative example 2 | Comparative example 3 | Comparative example 4 | Comparative example 5 |
| Removal rate of solid waste pollution | 90.1 | 85.8 | 76.4 | 77.6 | 76.1 | 77.3 |

The difference of Comparative example 1 from Embodiment 1 is that the through holes of the ecological prefabricated brick 2-5 and cavities of the snail shells are filled with silt that does not contain herb seeds.

The difference of Comparative example 2 from Embodiment 1 is that the oxygen injected into the curing cover is dry oxygen.

The difference of Comparative example 3 from Embodiment 1 is that the injection amount of the natural gas is consistent with the injection amount of the liquid oxygen during sintering.

The difference of Comparative example 4 from Embodiment 1 is that the cooling liquid includes the following components in percentage by mass: 20 to 30% of ethylene glycol, 15 to 20% of calcium chloride, and the balance of distilled water.

The difference of Comparative example 5 from Embodiment 1 is that mancozeb is not added to the interior of the gap.

Conclusion: Based on the data in the above table, by comparing the removal rate of the solid waste pollution in Embodiments 1 to 3 with Comparative example 1, it can be obtained that the treatment effect of the herb seed-containing silt on a solid waste polluted river channel is slightly worse than that of common silt. The reason is that the herb seed-containing silt may generate the slope protection green plants on the surfaces of the ecological prefabricated bricks, which can further promote the treatment of the solid waste pollution inside the river channels.

By comparing the removal rate of the solid waste pollution in Embodiments 1, 4, and 5 with Comparative example 2, it can be obtained that curing treatment effect of the dry oxygen injected in the Comparative example 2 on the ecological concrete is poorer, and water in the ecological concrete cannot be maintained while curing, so that the activity of the ecological concrete is reduced and the stability of the ecological prefabricated brick is further reduced, thereby weakening the treatment effect of the ecological prefabricated brick on the solid waste pollution in the river channels.

By comparing the removal rate of the solid waste pollutants in Embodiments 1, 6, and 7 and Comparative example 3, it can be obtained that the injection amount of the natural gas in Comparative example 3 is not adjusted, the action of an equal amount of natural gas is affected as sintering temperature and heating rate change, which results in that the injected natural gas not only promotes sintering, but also has an influence, thereby further affecting the treatment capacity of the ecological prefabricated brick. Taking comprehensive consideration, Embodiment 1 is an optimal firing solution.

By comparing the removal rate of the solid waste pollutants in Embodiments 1, 10, and 11 and Comparative example 4, it can be obtained that sorbic acid is not added in Comparative example 4. It can be seen that the treatment effect of the ecological prefabricated brick on the solid waste polluted river channel is obviously weakened. A synergistic effect is achieved by the combination of the sorbic acid and the ethylene glycol. The sorbic acid has a strong anti-corrosion effect, which can effectively improve the treatment effect on the solid waste polluted river channel while prolonging the service life of the ecological prefabricated brick.

By comparing the removal rate of the solid waste pollutants in Embodiments 1, 14, and 15 and Comparative example 5, it can be obtained that the step of not adding the mancozeb in Comparative example 5 also has an obvious influence on the removal rate of the river channel solid waste pollution. The reason is that the addition of the mancozeb can effectively promote the growth of the slope protection green plants between two adjacent ecological prefabricated bricks. By increasing the number of the slope protection green plants, the adsorption effect on solid pollution in the treatment method can be improved, thereby achieving a better treatment effect. Based on the treatment effects of various embodiments and comparative examples above, Embodiment 1 is an optimal solution.

The invention claimed is:
1. A treatment method for a sandy soil landfill solid waste polluted river channel, wherein a treatment system for a sandy soil landfill solid waste polluted river channel is used; the treatment system includes a ground water interception and diversion system (1) and a river channel ecological remediation system (2);
the ground water interception and diversion system (1) comprises a water intake well (1-1) arranged upstream of ground water in a landfill area, a buffer pool (1-5) communicated with the water intake well (1-1), and a wastewater treatment system (1-6) communicated with the buffer pool (1-5); the water intake well (1-1), the buffer pool (1-5), and the wastewater treatment system (1-6) are communicated through a wastewater pipe (1-2); and an electric wastewater valve (1-3) and a variable frequency water pump (1-4) are arranged on the wastewater pipe (1-2) in sequence;

the river channel ecological remediation system (2) comprises an impermeable layer arranged at a bottom of a river channel and ecological bank protections arranged on both sides of a river channel slope; the impermeable layer comprises a clay cover layer (2-1) with a thickness of 50 to 55 cm, bentonite (2-2) with a thickness of 30 to 35 cm, and a High-Density Polyethylene (HDPE) film (2-3) with a thickness of 1.5 to 3 mm in sequence from top to bottom; the ecological bank protections comprise ecological slope protections (2-4) arranged on slopes on both sides, ecological prefabricated bricks (2-5) arranged on ecological slope protections (2-4) on both sides, and slope protection green plants (2-6) planted between two adjacent ecological prefabricated bricks (2-5) and on the surfaces of the ecological prefabricated bricks (2-5); the ecological prefabricated bricks (2-5) are made of ecological concrete; through holes are formed in the prefabricated bricks;

treatment steps of the treatment method are as follows:

S1, construction of ground water interception and diversion system (1),

S1-1, arranging the water intake well (1-1) upstream of the ground water in the landfill area to ensure that the ground water does not flow through the solid waste landfill area;

S1-2, pumping the ground water by using the water intake well (1-1), enabling the ground water to enter the buffer pool (1-5) through the wastewater pipe (1-2), the electric wastewater valve (1-3), and the variable frequency water pump (1-4) in sequence, monitoring the water quality by using an online water quality detection instrument arranged in the buffer pool (1-5), discharging the water into the river channel in a case that the water quality is up to standards, enabling the wastewater to enter the wastewater treatment system (1-6) in a case that the water quality is up to standards, and treating the wastewater and discharging the wastewater to the river channel after the wastewater is up to the standards;

S2, construction of river channel ecological remediation system (2), laying the HDPE film (2-3), the bentonite (2-2), and the clay cover layer (2-1) at the bottom of the river channel in sequence from bottom to top;

S3, construction of bank protections, splicing and fixing the ecological prefabricated bricks (2-5) to the ecological slope protections (2-4) to construct ecological bank protections, and planting the slope protection green plants (2-6) between two adjacent ecological prefabricated bricks (2-5) and on the surfaces of the ecological prefabricated bricks (2-5), wherein a preparation process for the ecological prefabricated brick (2-5) comprises the following steps:

1) uniformly mixing ecological concrete, an adhesive, an additive, humus, and water serving as raw materials in a mass ratio of 12 to 36:2:0.3 to 0.5:5:8 to 10, pouring a mixture into a rectangular mold, and vibrating the interior of the mold by using a vibrating spear with a vibration frequency of 100 to 125 Hz during pouring until the shape of the mixture is flush with each side of the rectangular mold to obtain a green brick;

2) naturally air-drying the green brick in a drying room for 30 to 40 min, taking out the green brick, arranging x×y snail shells with cut-through tails on one side surface of the green brick, wherein x is 5 to 7, y is 3 to 4, and the units of x and y are pieces; drilling once between every two snail shells by using a drill bit to form a through hole; after drilling, placing the green brick in the drying room again; adjusting the temperature to 25 to 40° C., and continuing to dry for 10 to 15 min; finally, taking out the green brick and placing the green brick in a firing kiln, preserving heat at 1400 to 1500° C. for 1.5 to 3 h, firing and molding, taking out the green brick, and demolding to obtain a molded brick;

3) respectively filling the through holes and cavities of the snail shells with silt; continuing to place the green brick in the drying room; adjusting the temperature to 20 to 30° C., drying for 20 to 40 min, and taking out the green brick to obtain the ecological prefabricated brick (2-5), wherein the silt contains herb seeds, the seeding density reaches 10 to 25 kg/mu, and the herb seeds are any species of *Festuca arundinacea, bermuda* grass, or tifway;

the ecological concrete is a mixture obtained by mixing sandy soil in the river channel, fly ash, and cement in a weight ratio of 10 to 10 to 15:5 to 7:1 to 3; the adhesive is a mixture of one or more of gelatinized raw starch, borax, bentonite, and water-based epoxy resin adhesive; the additive is lime and/or barium carbonate; and the humus is a fermented and decomposed product of sawdust, fruit peels, and straw.

2. The treatment method for a sandy soil landfill solid waste polluted river channel according to claim 1, wherein curing treatment is performed on the ecological concrete, and a method for the curing treatment comprises the following steps:

storing the prepared ecological concrete inside a closed curing cover, uniformly covering the surface of the ecological concrete with a straw curtain, curing for 2 to 5 h at a temperature of 10 to 15° C., adjusting the temperature in the curing cover at a speed of 5 to 7° C./h, injecting wet oxygen with the purity of 99 to 99.99% at a speed of 5 to 10 mL/h in the curing cover until the temperature difference between the temperature in the curing cover and the outdoor temperature is 3 to 5° C., stopping heating, reducing the injection amount of the wet oxygen at a frequency of 0.5 to 1 mL/h, stopping injecting the wet oxygen and withdrawing the concrete out of the curing cover after the humidity of the ecological concrete in the curing cover reaches 70 to 80%, and standing and cooling for later use, wherein the water content of the wet oxygen is 20 to 30%.

3. The treatment method for a sandy soil landfill solid waste polluted river channel according to claim 1, wherein a demolding method comprises the following steps: transferring the mold into a cooling room, preliminarily cooling to 50 to 60° C. in the air at 25 to 35° C. first, then immersing the mold in a chamber filled with a cooling liquid and continuing to cool for 20 to 30 min, and finally, taking out the green brick from the mold to obtain the ecological prefabricated brick (2-5).

4. The treatment method for a sandy soil landfill solid waste polluted river channel according to claim 3, wherein the cooling liquid comprises the following components in percentage by mass: 20 to 30% of ethylene glycol, 15 to 20% of calcium chloride, 0.5 to 1.5% of sorbic acid, and the balance of distilled water.

5. The treatment method for a sandy soil landfill solid waste polluted river channel according to claim 1, wherein a permeability coefficient of the clay cover layer (2-1) is less than $10^{-5}$ cm/s.

6. The treatment method for a sandy soil landfill solid waste polluted river channel according to claim 1, wherein a method for planting the slope protection green plants (2-6) at a joint of the two adjacent ecological prefabricated bricks (2-5) comprises: reserving a gap of 3 to 5 cm between the two adjacent ecological prefabricated bricks (2-5), loosening slope soil in the gap at a depth of 5 to 7 mm, adding clay accounting for 10 to 15% of the mass of the slope soil and mancozeb accounting for 3 to 5% of the mass of the slope soil to the gap, stirring uniformly, and spraying urea into the gap according to 15 to 20 mL/time; spraying for 3 to 5 times; and finally, planting the slope protection green plants (2-6) in the gap.

\* \* \* \* \*